June 28, 1955 — O. C. OLSEN — 2,711,812
APPARATUS FOR HANDLING FREIGHT
Original Filed May 10, 1950

Olaf Christopher Olsen, Inventor
By Ogle R. Singleton, Attorney

United States Patent Office 2,711,812
Patented June 28, 1955

2,711,812

APPARATUS FOR HANDLING FREIGHT

Olaf Christopher Olsen, Johnson County, Kans., assignor to Transport Equipment, Inc., a corporation of Maryland Original application May 10, 1950, Serial No. 161,210. Divided and this application August 20, 1951, Serial No. 242,692

1 Claim. (Cl. 198—20)

My invention consists in a new and useful improvement in apparatus for handling freight, and is designed more particularly for handling freight of less than carload lots in containers which are handled entirely mechanically by conveyor mechanisms incorporated in loading and unloading platforms. This application is a divisional application of my co-pending parent application, Serial Number 161,210, filed May 10, 1950.

My improved loading and unloading platform is provided with conveyor cables to move the containers, and a travelling buggy having vertically reciprocable conveyor cables disposed transversely to the platform conveyor cables, whereby the containers can be moved onto and off of the platform and imposed upon and raised from the platform conveyor cables.

While I have illustrated in the drawing filed herewith and have hereinafter fully described a specific embodiment of my invention, it is to be distinctly understood that I do not consider my invention to be limited to said specific embodiment, but refer for its scope to the claim appended hereto.

Figure 2:
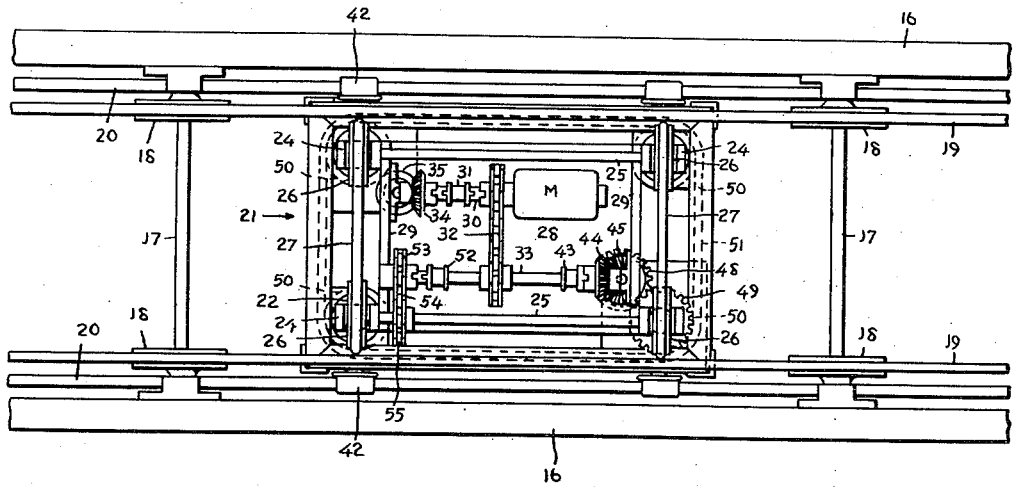
Fig. 2 is a top plan view of the platform conveyor and the buggy shown in Fig. 1.

As shown in the drawing, the platform consists of pillars 15 and horizontal beams 16 carried thereby and having journaled therein axles 17 with pulleys 18 carrying conveyor cables 19. It is obvious that by providing suitable driving means for any one of the axles 17, the containers C can be moved by the conveyor cables 19. It is to be understood that I may provide a plurality of trackways on the platform. With each trackway of the platform, I provide rails 20 on which travels a buggy 21 in which are rotatably mounted four interiorly threaded sleeves 22 in each of which is carried a complementarily threaded post 23 provided with a forked end 24 in which are journaled shafts 25 carrying pulleys 26, each pair of which has the conveyor cable 27. As clearly illustrated in Fig. 2, these cables 27 are disposed transversely to the trackway of the platform. A platform 28 has flanges 29 suitably fixed to the forked ends 24 of the posts 23. Mounted on the platform 28 is a motor M having its shaft 30 provided with a double clutch 31 to connect shaft 30 by sprocket chain 32 to countershaft 33, and alternatively to connect shaft 30 with miter gears 34, 35 to drive a square shaft 36 slidable in a socket 37 driving miter gears 38, 39 driving belt 40 on axle 41 of wheels 42 of the buggy 21 mounted on the rails 20 of the platform. The countershaft 33 is connected by clutch 43 to miter gears 44, 45 to drive a square shaft 46 slidable in socket 47 having a pinion 48 meshing with a pinion 49 on one of the sleeves 22. Each sleeve 22 is provided with a peripheral sprocket wheel 50 with which co-acts the sprocket chain 51. The countershaft 33 is connected by a clutch 52 to a sprocket wheel 53 having a sprocket chain 54 connected to sprocket wheel 55 on shaft 25.

Figure 1:
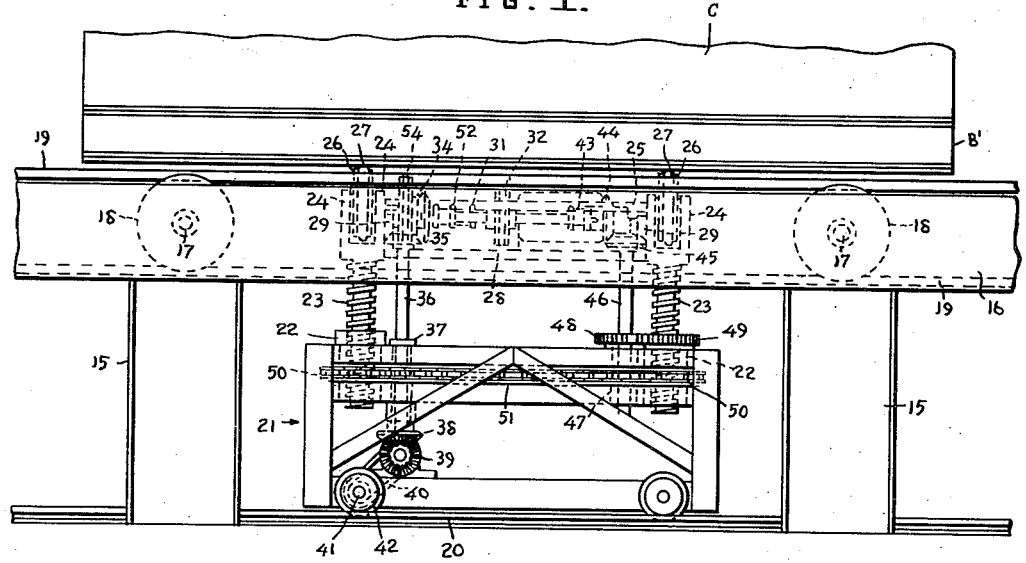
Fig. 1 is a side elevation of the platform conveyor and the buggy co-operating therewith and supporting a container.

Having described the details of construction of the platform, I will now describe its use. With the parts disposed as illustrated in Fig. 1, the container C is imposed on the outer ends of the cables 27, at either side of the buggy 21. The motor M through clutches 31 and 52 actuates shaft 25 to drive pulleys 26 and cables 27 to move the container C transversely of buggy 21 to a position so that its beams B' are positioned in proper relation to cables 19 of the conveyor platform. The motor M through clutches 31 and 43 actuates the sleeves 22 to cause the posts 23 to be depressed, lowering the container C until it is imposed upon the cables 19. Actuating any one of the axles 17 and the pulleys 18 causes the cables 19 to move the container C along the trackway of the platform.

Having described my invention, what I claim is:

In apparatus for handling freight, the combination of a container for the freight; a loading platform provided with a pair of parallel conveyor cables adapted to move the container along said platform; a buggy mounted for travel in either direction longitudinally of said cables; a vertically movable platform mounted on said buggy and adapted to move between said cables; a pair of parallel conveyor cables mounted on said buggy platform and disposed transversely of the cables of said loading platform; means adapted to cause said buggy to travel; means adapted to raise and lower said buggy platform to position said transverse cables above and below said loading platform cables; means adapted to drive said cables on said buggy platform; a motor mounted on said buggy platform and adapted to drive each of said means; and means adapted to selectively connect said motor with said means to cause said buggy to travel, said means to raise and lower said buggy platform, and said means to drive said buggy cables.

References Cited in the file of this patent

UNITED STATES PATENTS

| 991,411 | Anderson | May 2, 1911 |
| 1,471,149 | Drake | Oct. 16, 1923 |
| 2,063,431 | Grayson et al. | Dec. 8, 1936 |
| 2,156,248 | Wagner | Apr. 25, 1939 |

FOREIGN PATENTS

| 595,507 | Germany | Apr. 18, 1934 |
| 249,270 | Switzerland | Apr. 10, 1948 |